US012561372B2

(12) United States Patent
Ough et al.

(10) Patent No.: US 12,561,372 B2
(45) Date of Patent: Feb. 24, 2026

(54) GRAPH DATABASE STORAGE OPTIMIZATION

(71) Applicant: NetApp, Inc., San Jose, CA (US)

(72) Inventors: Alex Xeong-Hoon Ough, Austin, TX (US); Yun Shen, Bristol (GB); Azzedine Benameur, Fairfax, VA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/923,775

(22) Filed: Oct. 23, 2024

(65) Prior Publication Data

US 2025/0371076 A1 Dec. 4, 2025

Related U.S. Application Data

(60) Provisional application No. 63/654,830, filed on May 31, 2024.

(51) Int. Cl.
*G06F 16/00* (2019.01)
*G06F 16/25* (2019.01)
*G06F 16/901* (2019.01)

(52) U.S. Cl.
CPC ........ *G06F 16/9024* (2019.01); *G06F 16/254* (2019.01)

(58) Field of Classification Search
CPC ........................... G06F 16/9024; G06F 16/901
See application file for complete search history.

(56) References Cited

U.S. PATENT DOCUMENTS 11,651,055 B2 * 5/2023 Saillet .................... G06N 5/025 382/159
2016/0259832 A1 * 9/2016 Shore .................. G06F 16/9024
2018/0246987 A1 * 8/2018 Das ......................... G06F 16/23

* cited by examiner

*Primary Examiner* — Cheryl Lewis

(57) ABSTRACT

Systems and methods are disclosed for implementing a process for graph database storage optimization, applicable to delta-based cloud asset tracking. In certain embodiments, a method may comprise implementing a delta-based graph storage optimization system for asset tracking in a cloud environment, including storing a graph database representing a configuration of a cloud environment, obtaining configuration settings representing a current state of the cloud environment from a cloud platform, and identifying a delta based on changes between the configuration from the graph database and the configuration settings from the cloud platform. The method may further comprise creating an asset property node based on the delta, and adding the asset property node to the graph database without creating a new graph based on the configuration settings.

20 Claims, 5 Drawing Sheets

200

Cloud Provider 206

Configuration Data 208

Asset Tracking System 210

ETL Module 211

Configuration JSON 222

Graph Update Module 217

Deltas 224

Change Analysis Module 215

Graph JSON 220

Synchronize Module 213

Graph Data 214

Database 212

GRAPH DATABASE STORAGE OPTIMIZATION

CROSS-REFERENCE TO RELATED APPLICATION

The present application claims priority to U.S. provisional patent application, Application No. 63/654,830, filed May 31, 2024, entitled "GRAPH DATABASE STORAGE OPTIMIZATION", the contents of which are hereby incorporated by reference in their entirety.

FIELD

Various embodiments of the present disclosure generally relate to graph databases and tracking of change history. In particular, some embodiments relate to an approach for graph storage optimization for configuration change management relating to cloud assets of a cloud customer.

BACKGROUND

In cloud environments (e.g., Amazon Web Services (AWS), Google Cloud Platform (GCP), and Microsoft Azure), it may be desirable to track the history of changes to customers' cloud assets or resources to facilitate, among other things, management of rebuilds. This tracking may typically be done by maintaining multiple point-in-time views in the form of graphs in a graph database, in which the nodes represent instances of assets or resources and the connections between the assets represent properties.

In order to manage relationships among cloud assets of a cloud customer, a current configuration state for the cloud assets may typically be reported by the cloud environment (e.g., AWS, GCP, and Azure) to the cloud customer (or an entity managing the relationships on their behalf) on a periodic basis. The provided configuration state may simply represent the current settings for the cloud assets, and may provide no indication of changes over time. Current approaches to track assets' histories may rely on re-creating a new graph every time a change occurs or current state information is received. This means that, if an existing asset's relationship is modified or a new asset is added, an entirely new graph may be stored with a timestamp (to track graph changes over time), leading to increased storage and data management complexity. Since a snapshot of the customer environment (representing the current state) may be received from the cloud provider every 5 to 10 minutes, prior change management approaches would store as many as 288 graphs over the course of a 24-hour period and over 1,400 graphs during a business work week. This can introduce enormous inefficiencies in storage and data management. Accordingly, there exists a need for an improved approach to managing graph database storage for change management.

The information provided in this section is presented as background information and serves only to assist in any understanding of the present disclosure. No determination has been made and no assertion is made as to whether any of the above might be applicable as prior art with regard to the present disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In certain embodiments, a method may comprise implementing a delta-based graph storage optimization system for asset tracking in a cloud environment, including storing a graph database representing a configuration of a cloud environment, obtaining configuration settings representing a current state of the cloud environment from a cloud platform, and identifying a delta based on changes between the configuration from the graph database and the configuration settings from the cloud platform. The method may further comprise creating an asset property node based on the delta, and adding the asset property node to the graph database without creating a new graph based on the configuration settings.

In certain embodiments, a system may comprise an asset tracking system configured to implement a delta-based graph storage optimization system for asset tracking in a cloud environment. The asset tracking system may store a graph database representing a configuration of a cloud environment obtain configuration settings representing a current state of the cloud environment from a cloud platform, identify a delta based on changes between the configuration from the graph database and the configuration settings from the cloud platform, create an asset property node based on the delta, and add the asset property node to the graph database without creating a new graph based on the configuration settings.

In certain embodiments, a memory device may store instructions that, when executed, cause a processor to perform a method comprising implementing a delta-based graph storage optimization system for asset tracking in a cloud environment, including storing a graph database representing a configuration of a cloud environment, obtaining configuration settings representing a current state of the cloud environment from a cloud platform, and identifying a delta based on changes between the configuration from the graph database and the configuration settings from the cloud platform. The instructions may cause the processor to perform the method further comprising creating an asset property node based on the delta, and adding the asset property node to the graph database without creating a new graph based on the configuration settings.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein.

DETAILED DESCRIPTION

Figure 1:
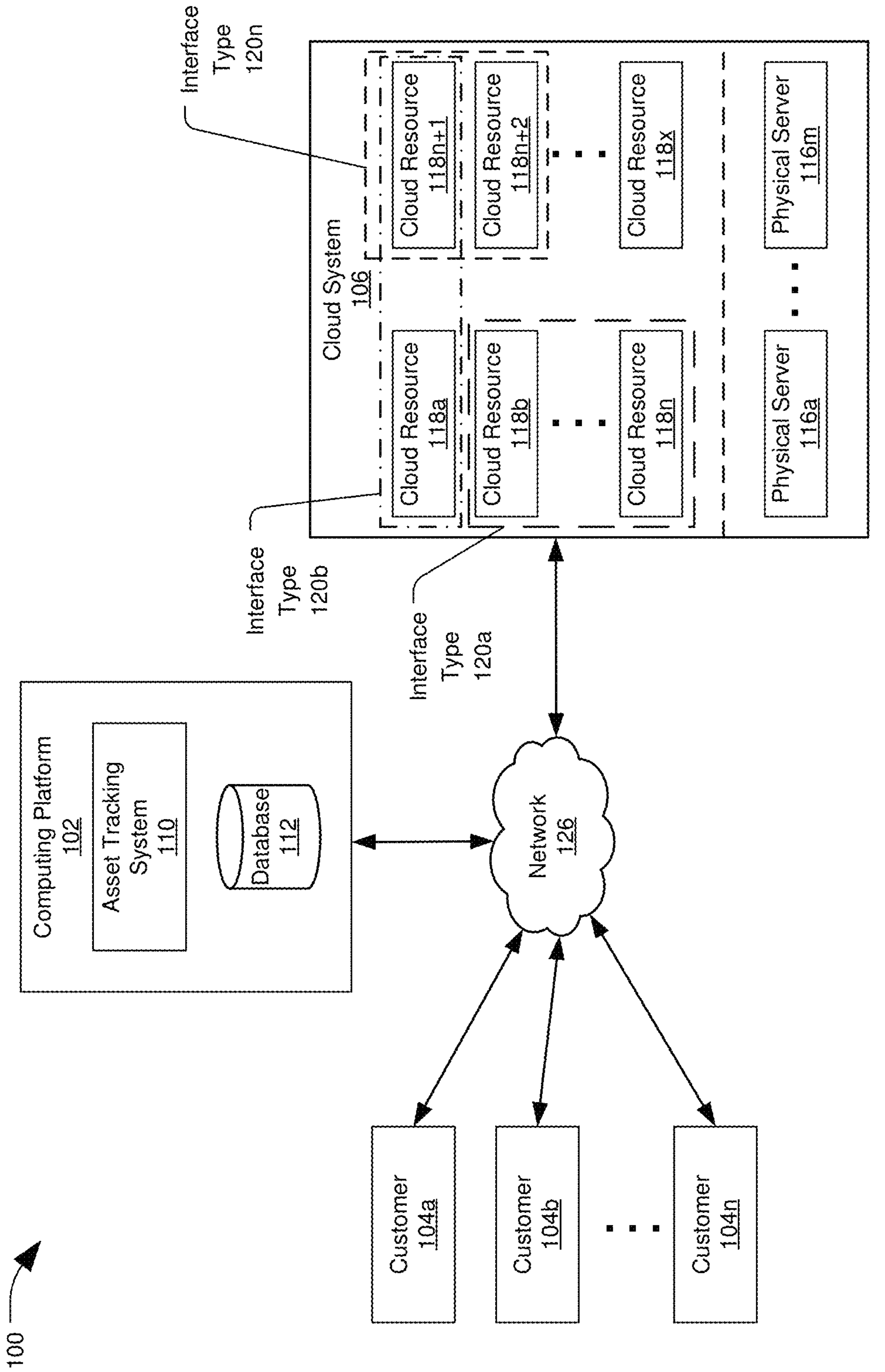
FIG. 1 depicts a diagram of a system configured to implement graph database storage optimization, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a physical device, such as a computer readable storage medium or memory device, including instructions that, when executed, cause a processor to perform the methods.

As used herein a "cloud," "cloud system," "cloud platform," "cloud computing environment," and/or "cloud environment" broadly and generally refers to a platform through which cloud computing may be delivered via a public network (e.g., the Internet) or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a hyperscaler (which may also be referred to herein as a cloud service provider or simply a cloud provider) (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), Infrastructure-as-a-Service (IaaS), or Function-as-a-Service (FaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds). As used herein, "cloud infrastructure" or simply "infrastructure" generally refers to cloud services, infrastructure, platforms, or software that are hosted by a cloud service provider and made available to users through the Internet.

As used herein, a "cloud instance" or simply an "instance" generally refers to a virtual server (or virtual machine) from a public cloud hosted on a cloud service provider's infrastructure. Since it may be costly and inefficient for organizations to maintain physical server resources on premises, many organizations are turning to cloud providers as an alternative (or supplement) to maintaining such physical server resources by making use of the hardware maintained by cloud providers in their data centers via virtual access (in the form of one or more cloud instances) to such physical server resources. For example, a cloud instance generally abstracts underlying physical computing infrastructure of the cloud service provider using virtual machine technology and presents a collection of one or more server resources (e.g., processing resources, memory resources, storage resources, or networking resources) of underlying physical computing infrastructure (e.g., a physical server) as a virtual server for use by the customer or consumer (e.g., an individual end user or an organization) on which the customer may run their workloads. Cloud instances may include reserved, on-demand, or spot instances, which may be offered by a cloud provider in accordance with different pricing models. For example, a cloud customer may make a reservation of cloud resources and capacity (e.g., for one or three years) and purchase a reserved instance at contract prices, plus hourly rates. For on-demand instances, a cloud customer generally pays for cloud resources used (e.g., measured in time or based on resource capacity actually used) with no long-term commitment and such instances may automatically scale up or down with changing workloads. Finally, spot instances represent instances that use spare capacity that may be made available by cloud providers for steep discounts compared to prices of on-demand instances. Spot instances may be interruptible by the cloud provider (with short notice). So, while spot instances use the same underlying instances as on-demand and reserved instances, they are best suited for fault-tolerant, flexible workloads. Non-limiting examples of reserved instances, on-demand instances, and spot instances include Amazon Elastic Compute Cloud (EC2) reserved instances, Amazon EC2 on-demand instances, and Amazon EC2 spot instances, respectively.

As used herein, a "cloud asset" generally refers to any type of resource that can or does contribute to delivery of cloud services. Non-limiting examples of cloud assets include instances, elastic network interfaces (ENIs), virtual private clouds (VPCs), cloud storage buckets, databases, subnets, policies, security keys, Internet Protocol (IP) addresses, and the like.

Systems and methods are described for cloud asset tracking. At present, management of relationships among cloud assets of a cloud customer is typically facilitated by the periodic reporting by the cloud environment of the current state (e.g., a snapshot or time view of the current configuration of the customer environment) including those configurations that have changed as well as those configurations that have not changed and without identifying which configurations have changed. In order to maintain change histories, the cloud customer (or a commercial service operating on behalf of the cloud customer) rebuilds a graph of all of the cloud assets based on the newly received snapshot and stores the graph in a graph database. As some customer environments may be notified regarding configuration changes every 5 to 10 minutes, this means over 250 graphs may be stored within the graph database for a mere 24 hour period. Given the number of instances may be in the tens of thousands or more for a single customer environment and the numerous relationships among the instances and other cloud assets, these graphs quickly become complex to create/change/rebuild and utilize a significant amount of storage space.

Embodiments described herein seek to more efficiently address this change management problem and reduce the complexity by working with a single graph, maintaining a history of any changes made to a cloud asset through the creation of a new asset property node (instead of directly altering the existing cloud asset node), and enriching all relationships associated with a cloud asset with a start timeframe and an end timeframe (e.g., "rel.from" and "rel.to" properties) specifying the timeframe during which the relationship was valid. As described further below, in one embodiment a delta-based approach is employed that focuses solely on the changes in the data received in the snapshot from the cloud provider.

While various examples may be described with reference to cloud asset tracking, it is to be appreciated the methodologies described herein are equally applicable to other problem spaces in which efficient management of change histories is desired.

In the following description, numerous specific details are set forth in order to provide a thorough understanding of embodiments of the present disclosure. It will be apparent to one skilled in the art, however, that embodiments of the present disclosure may be practiced without some of these specific details. In some instances, certain structures and devices are shown in block diagram form.

FIG. 1 depicts a diagram of a system 100 configured to implement graph database storage optimization, in accordance with certain embodiments of the present disclosure. The system 100 may include, among other things, a computing platform 102, one or more cloud customers (e.g., customers 104*a-n*), and a cloud system 106. These aspects of the system 100 may communicate with each other via a network 126. The network 126 may be, for example, the Internet, a local area network, a wide area network, or a wireless network (to name a few examples). The network 126 may include a variety of transmission media including cables, optical fibers, wireless routers, firewalls, switches, gateways, or other devices to facilitate communications between one or more of the aspects of the system 100.

Cloud system 106 may be a provider of cloud infrastructure for one or more of the cloud customers 104. Each cloud customer 104 may include a business, enterprise, or other organization having its own cloud environment and associated assets, and that may have its own policies, permissions, resources, and other configurations for its cloud environment. Cloud system 106 may represent a cloud platform of a cloud provider through which the cloud provider offers a variety of cloud computing solutions, such as IaaS (infrastructure as a service), SaaS (software as a service), or PaaS (platform as a service), other solutions, or any combination thereof. For example, cloud system 106 may be a public cloud provider, non-limiting examples of which include AWS, Microsoft Azure, and GCP. The cloud system 106 may represent a multi-tenant cloud provider that may host a variety of virtualization tools that cloud customers 104 may request to host or otherwise run one or more applications (e.g., via the network 126). Alternatively, the cloud system 106 may represent a private cloud provider, such as an enterprise cloud for a given organization.

Cloud system 106, generally, may provide infrastructure including any set of resources 118 used for executing one or more containers, virtual machines, or other hosted virtualization tool. Resources may include various types of virtual machines (or instances) having various combinations of one or more of compute resources (e.g., CPU or GPU resources), memory resources, caching resources, storage space resources, networking or communication capacity resources, etc. that a virtualization tool such as a container may use for execution of one or more workloads for cloud customers 104. Examples of these resources are illustrated in FIG. 1 as cloud resources 118*a-x* of cloud system 106. The cloud system 106 may offer cloud instances that include any number of cloud resources in any of a variety of combinations (e.g., as shown by instance types 120*a-n*). As just one example, a set of one or more of cloud resources 118*a-x* may be offered in the form of an AWS EC2 instance (e.g., representing virtualized capacity of compute, memory, storage, and networking resources of underlying physical servers 116*a-m*).

The usage model for the cloud system 106 may vary from customer-to-customer. For example, customer 104*a* (or another of customers 104*b-n*, but referring to 104*a* for simplicity herein) may run one or more virtualization layers, such as virtual machines or containers on one or more cloud resources 118*a-x* of cloud system 106, via network 126. For example, a container may use a level of system level virtualization, such as by packaging up application code and its dependencies (e.g., system tools, system libraries or settings, etc.) so that the hosted application can be executed reliably on one or more computing platforms of the cloud system 106 (as an example). Some examples of software may include, for example, Red Hat® OpenShift®, Docker® containers, chroot, Linux®VServer, FreeBSD® Jails, HP-UX® Containers (SRP), VMware ThinApp®, etc. Containers may run on the cloud system 106 on a host operating system directly, or may be run via another layer of virtualization (such as within a virtual machine).

Cloud customers 104*a-n* may orchestrate one or more containers using the cloud resources 118*a-x* using an orchestrator (not shown). Orchestration may refer to scheduling containers within a predetermined set (e.g., a cloud instance of one of instance types 120*a-n*) of available infrastructure represented by the cloud resources 118*a-x*. The orchestrator may be used to determine the required infrastructure based upon the needs of containers being executed or requested for execution. For example, an orchestrator may map each container to a different set of cloud resources 118*a-x*, such as by selecting a set of containers to be deployed on each cloud resource 118*a-x* that is still available for use. Examples of an orchestrator may include Kubernetes®, Docker Swarm®, AWS Elastic Container Service™, etc. Generally, it may refer to a container orchestrator that is executed on a host system (e.g., one of physical servers 116*a-m*) of cloud system 106, for example, in the form of the computer system or module. The orchestrator may further include a scheduler (not shown). Scheduler may be used to make an actual request for infrastructure and allocation of containers to the infrastructure to the cloud system 106. An example of a scheduler may include a Kubernetes® scheduler, which may execute on a host within network 126, either on the same hardware resources as the orchestrator or on other hardware or software resources.

The system 100 may further include computing platform 102. The computing platform 102 may be part of a cloud analytics, recommendation, or security platform utilized by cloud customers 104. In other examples the computing platform 102 may be part of a larger service offering (e.g., NetApp's Spot cloud automation solution, available from NetApp, Inc. of San Jose, CA) that goes beyond cloud analytics, security, and recommendations and also facilitates automation or optimization of cloud customers' cloud infrastructure in one or more cloud platforms (e.g., cloud system 106, non-limiting examples of which include AWS, Azure, and GCP). Depending on the particular relationship between cloud customers 104 and the computing platform 102, the computing platform 102 may observe various interactions between the cloud customers 104 and the cloud system 106, facilitate such interactions, or perform monitoring of various aspects of the cloud system 106 on behalf of cloud customers 104, for example, to help cloud customers 104 make optimal or secure use of cloud services and cloud resources, or provide input or recommendations to cloud customers 104 to facilitate or prioritize cloud security management.

In the context of the present example, the computing platform 102 may be shown including an asset tracking system 110 and a graph database 112. These may be executed by one or more processors of one or more computer systems or modules, for example. In one embodiment, as a result of its relationship with cloud customers 104, the cloud platform 102 may receive (e.g., directly from cloud customers 104 or via the cloud system 106) on a periodic basis, or proactively request from the cloud system 106, a point-in-time snapshot of the current state of the cloud customer's 104 environment, for example, including the current configuration of all cloud assets employed by the cloud customer 104.

Based on a configuration snapshot received from the cloud system 106, the asset tracking system 110 may avoid the computationally and storage expensive approach of rebuilding the entire graph structure of the cloud customer's environment, and may instead implement a more efficient approach to managing updates that focuses solely on the changes in the data as described further below. These changes may be applied to the existing single graph of the cloud customer's environment and persisted to the graph database 112.

In particular, the asset tracking system 110 may maintain a single graph for a cloud customer's 104 environment, which may be updated with incremental changes. The asset tracking system 110 may compute or determine change deltas between a current state of the cloud environment and the most recent snapshot. Instead of modifying existing asset nodes in the knowledge graph, the asset tracking system 110 may create new asset property nodes connected to the cloud asset that underwent changes. The asset property nodes may designate an asset status, or in some examples an asset change relative to the base asset node. The asset property nodes may also have "from" and "to" validity times, so it may be easily determined when the status of the asset node was active or current. These asset property nodes allow the customer 104 and asset tracking system 110 to maintain a complete history of the asset's state as well as times as which the relationships existed. In this manner, changes over time to the knowledge graph may be represented by the addition of a number of asset nodes to a single existing graph, rather than recreating and storing a new graph for every update.

While in the context of the present example, the graph database 112 is shown as being part of the computing platform 102, it is to be appreciated in other examples the graph database 112 may be in communication with the computing platform 102 (e.g., part of a separate computing platform, etc.). An example asset tracking system 110 is described in regard to FIG. 2.

Figure 2:
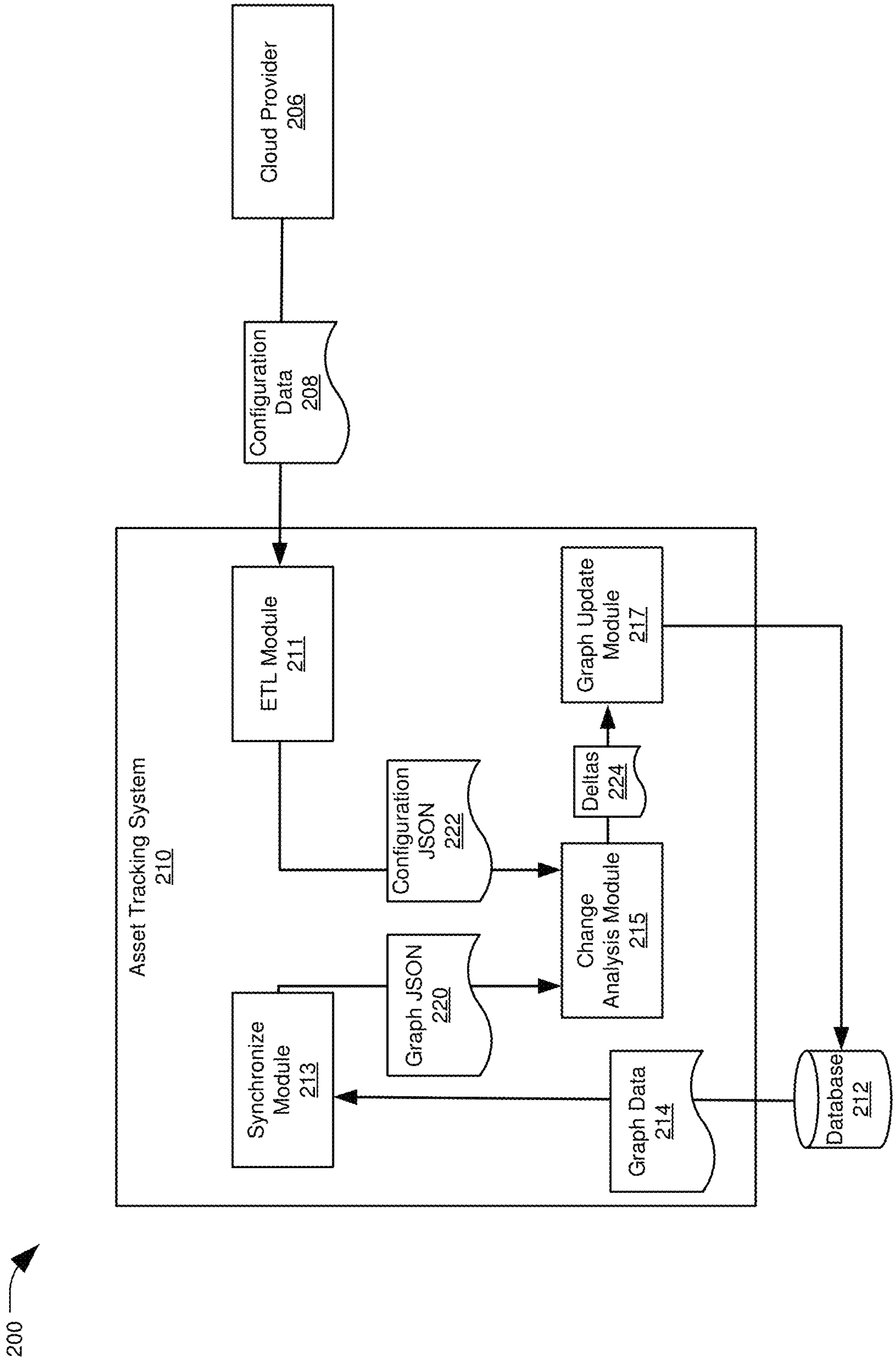
FIG. 2 depicts a diagram of a system configured to implement graph database storage optimization, in accordance with certain embodiments of the present disclosure.

FIG. 2 depicts a diagram of a system 200 configured to implement graph database storage optimization, in accordance with certain embodiments of the present disclosure. In particular, FIG. 2 may depict a block diagram illustrating various functional units of an asset tracking system 210, as well as a cloud provider 206 and a graph database 212, which may correspond to asset tracking system 110, cloud provider 106, and graph database 112 of FIG. 1, respectively. Asset tracking system 210 may include an ETL (extract, transform, load) module 211, a synchronize module 213, a change analysis module 215, and a graph update module 217. The asset tracking system 210 may be configured to identify changes to assets of a cloud environment, create asset nodes to reflect those changes, and update an existing knowledge graph for the cloud environment based on the asset nodes.

Asset tracking system 210 may receive or obtain configuration data 208 for a cloud environment hosted by cloud provider 206, for example on behalf of a cloud customer. The configuration data 208 may include a current snapshot or details for the cloud assets of the environment as they presently exist. The configuration data 208 may be sent to asset tracking system 210 by cloud provider 206 on a regular basis or selected interval, in response to configuration changes, or at other times. In some examples, asset tracking system 210 may retrieve the configuration data 208 from cloud provider 206, for example using an API (application programming interface).

The configuration data 208 may be received by an ETL module 211 of the asset tracking system 210. The ETL module 211 may be configured to extract configuration data 208 from cloud providers 206, and transform it into a consistent format (e.g., JSON, JavaScript Object Notation format) using an extract, transform, load (ETL) process. The ETL module 211 may be configured with a conversion algorithm configured to receive data in a first format and output the data in a second format. The converted configuration data may be provided to a change analysis module 215 in the form of configuration JSON data 222.

A synchronize module 213 of asset tracking system 210 may obtain or receive graph data 214 from graph database 212. The graph data 214 may be a graph table or database representation of the cloud environment and its asset configurations. The graph data 214 may include nodes representing assets, and edges representing the relationship between the asset nodes. The synchronize module 213 may be configured to convert the nodes and relationships within the current graph data 214 to a same format or structure as the ETL module 211 output (e.g., JSON form). The produced graph JSON 220 may be provided to the change analysis module 215.

The change analysis module 215 may be configured to compare the two JSON datasets 220, 222, and extract the differences between them (e.g., additions, deletions, modifications). For example, the change analysis module 215 may compare the graph data 214 stored to database 212 against the current configuration data 208, and determine whether any configurations have changed since the graph data 214 was stored last. The change analysis module 215 may identify changes using methods such as timestamps or change logs to pinpoint specific assets and relationships affected by the new data. The change analysis module 215 may then perform comparative analysis, including comparing the properties of the identified items in the new data (e.g., configuration JSON 222) with their corresponding entries in the existing graph (e.g., graph JSON 220). The change analysis module 215 may then extract the deltas 224 based on the comparison, producing only the changes that reflect what's new, updated, or deleted. The deltas 224 may refer to changes between the old or previous data and the newest data. The change analysis module 215 may provide the deltas 224 to the graph update module 217.

The graph update module 217 may perform incremental updates to the graph database 212. Based on the delta, the graph update module 217 may update, remove, or create nodes and relationships in the knowledge graph 212, thereby avoiding processing an entire new graph for every update in configuration data 208. In particular, the graph update module 217 may leverage the extracted delta 224 to efficiently create new "asset property nodes" and relationships, or update the relationships. The asset property nodes may be connected to an associated asset in the graph via an edge, and may indicate a current configuration value or setting for that asset that has changed based on the newest configuration data 208. If an asset changes repeatedly over time, it may be connected to a plurality of asset property nodes or connections that reflect how the settings for the asset has changed over time, with the asset property nodes including timestamps or "from" and "to" times indicating the period during which those asset properties were valid or active. By focusing on the delta 224 instead of rebuilding the entire graph, this approach can significantly reduce processing overhead and improve storage efficiency, especially for frequent updates. The graph update module 217 may store the graph updates (e.g., the new asset property nodes) to the graph database 212. An example user interface for a graph database storage optimization system is described in regard to FIG. 3.

Figure 3:
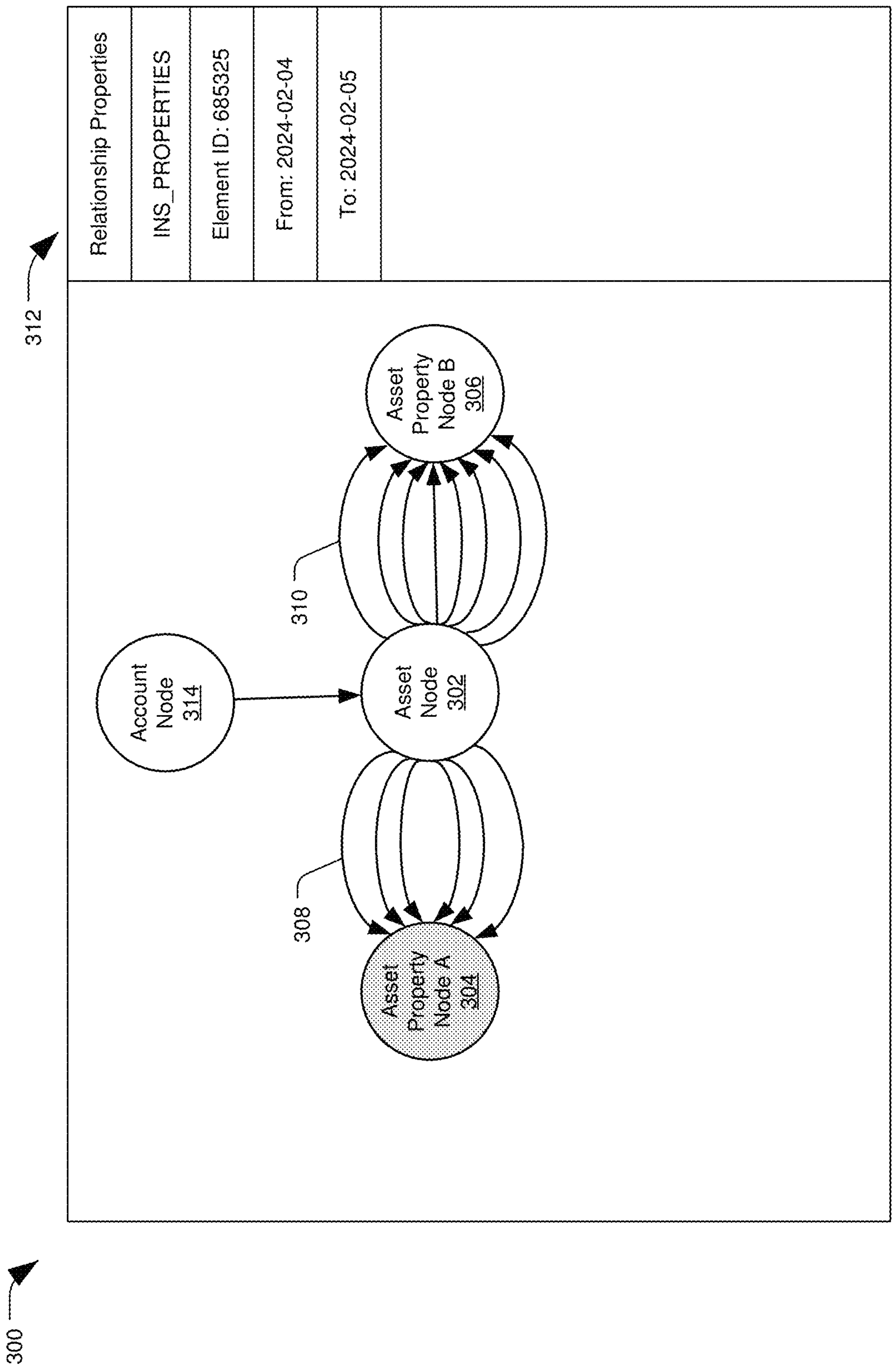
FIG. 3 depicts a diagram of a system configured to implement graph database storage optimization, in accordance with certain embodiments of the present disclosure.

FIG. 3 depicts a diagram of a system 300 configured to implement graph database storage optimization, in accordance with certain embodiments of the present disclosure. In particular, FIG. 3 depicts an example user interface (UI) of an asset tracking system (e.g., asset tracking system 110) showing a graph of an example cloud asset node 302 and associated asset property node A 304 and asset property node B 306 of a cloud customer (e.g., one of cloud customers 104*a-n*). In the context of the present example, a link or edge between nodes, such as link 308 and link 310, may include information about the relationship between the connected nodes.

The example UI of system 300 shows how asset properties may be maintained or tracked through changes or updates, in accordance with various embodiments of the present disclosure. In one embodiment, a "history management" technique may be used to maintain a consistent history of modifications, whereby any changes made to an asset 302 may be reflected through the creation of a new asset property node 304-306, instead of directly altering the existing node 302. In another example, an asset property node 304-306 may represent a configuration or property category for asset node 302, and each link 308-310 may represent a value for that configuration or property for a point in time, so that when the configuration is changed, a new link 308-310 may be added for the corresponding asset property node. Either embodiment can facilitate easy comparison and retrieval of previous versions while tracking each of the point-in-time changes. For example, in the context of system 300, two examples of asset property nodes, property node A 304 and property node B 306, are shown for maintaining historical information regarding asset node 302.

In this example, various node or link properties for a selected element may be shown in a sidebar 312. For example, link 308 may be selected, and the sidebar 312 may show "relationship properties" for how asset node 302 and asset property node A 304 are related. For example, asset node 302 may be an example instance, and the link 308 may represent "INS_PROPERTIES" for instance properties, and may have an element identifier (ID). As shown in FIG. 3, multiple instance properties ("INS_PROPERTIES") links may be maintained between the instance asset node 302 and the respective asset property nodes 304-306. In some embodiments, each of these links 308-310 may include associated "from" and a "to" properties or fields, specifying the timeframe during which the relationship was or is valid. For example, link 308 may have become active on 2024 Feb. 4, and may have been replaced with a different configuration or asset property setting on 2024 Feb. 5. The dates may be stored as 'rel.to' and 'rel.from' metadata elements, showing when the link or asset property node was relevant ("from"), and when it became irrelevant or replaced ("to"). When a new asset version is created, the "to" property of existing relationships connected to the previous version will be updated to the current "DateTime" value. This indicates the end of the relationship's validity with the previous version. Advantageously, this enables efficient tracking of changes over time and facilitates efficient processing of queries based on specific date and time ranges. An example process for implementing graph database storage optimization is shown in FIG. 4.

Figure 4:
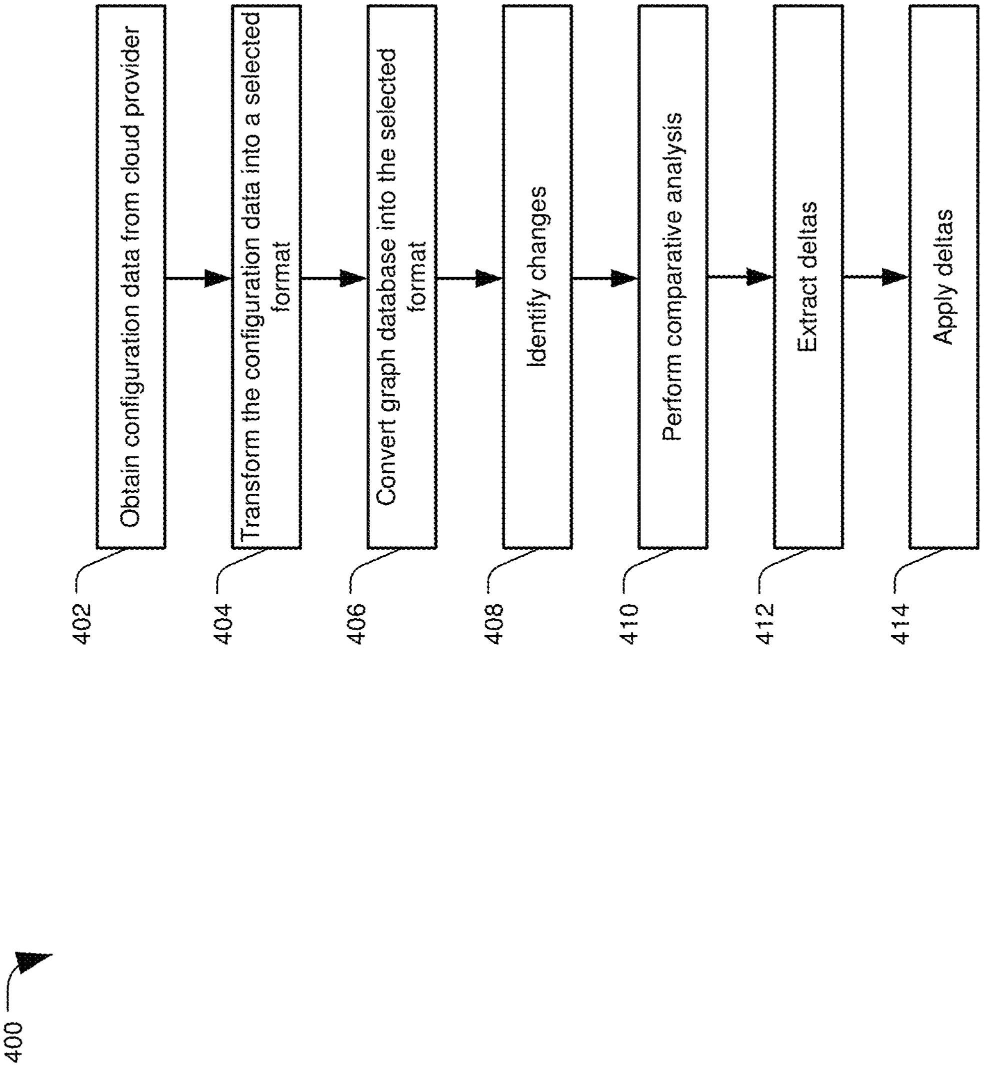
FIG. 4 depicts a flowchart of an example method for implementing graph database storage optimization, in accordance with certain embodiments of the present disclosure.

FIG. 4 depicts a flowchart 400 of an example method for implementing graph database storage optimization, in accordance with certain embodiments of the present disclosure. In particular, the method of FIG. 4 may be a process for a delta-based approach for cloud asset tracking, by identifying changes to elements of a graph database and creating asset property nodes in the existing graph to reflect the changes. The method may be implemented by components described in regard to FIG. 1, such as computing platform 102, asset tracking system 110, and database 112 of FIG. 1. Other components, such as cloud customers 104*a-n*, network 126, and cloud system 106, or some combination thereof, may also be involved in the method of FIG. 4. As noted above, in one embodiment, the computing platform may be part of a cloud analytics or recommendation platform utilized by cloud customers (e.g., customers 104*a-n*). In other examples the computing platform may be part of a service offering (e.g., NetApp's Spot cloud automation solution) that provides cloud customers with recommendations based on various forms of cloud analytics, and also facilitates automation or optimization of cloud customers' cloud infrastructure in one or more cloud platforms (e.g., cloud system 106, non-limiting examples of which include AWS, Azure, and GCP).

At 402, a point-in-time snapshot of the current state of a cloud customer's environment may be received or obtained by the asset tracking system. For example, a cloud platform may send a snapshot or current state of a cloud environment at a regular interval, in response to a change in the environment, or based on other triggers. In some embodiment, a computing platform may retrieve the cloud environment state data using an API or other interface.

The method may include transforming the configuration data into a selected format, such as using an ETL process to transform the data into a consistent JSON format, at 404. At 406, the method may include converting all nodes and relationships or links in the local graph database for the cloud environment into the selected format (e.g., JSON).

The method may include comparing the two converted datasets in order to identify any changes to cloud environment since the graph database was last updated, at 408. Changes may be identified using appropriate methods such as comparing timestamps to a time of the most recent graph database update, evaluating change logs, or using other methods to identify the specific assets and relationships affected by changes in the new data.

At 410, the method may include performing comparative analysis between the new configuration data and the graph database representation of the cloud environment. For example, the properties of the identified items in the new data may be compared with their corresponding entries in the existing graph.

At 412, deltas may be extracted based on the comparative analysis. For example, based on the comparison performed at 410, only the changes that reflect what's new updated, or deleted may be extracted. This extracted information constitutes the "delta," representing changes to the cloud environment since the last graph database update.

At 414, the deltas may be applied. In one embodiment, the extracted deltas may be leveraged to efficiently create new nodes and relationships, or update the relationships by utilizing the above-identified "history management" technique. The new nodes and relationships may be added to the graph database and stored. For example, if a delta indicates that an asset was deleted, a new asset property node may be created for that asset indicating that the asset was deleted, rather than deleting the asset itself from the graph database.

While in the context of the flow diagram of FIG. 4 a number of enumerated blocks are included, it is to be understood that examples may include additional blocks before, after, or in-between the enumerated blocks. Similarly, in some examples, one or more of the enumerated blocks may be omitted or performed in a different order.

Non-limiting examples of benefits of the delta-based approach for cloud asset tracking proposed herein include, among other things (e.g., compute and storage efficiencies) providing a clear change history, as each modification may be documented through a dedicated node, providing a transparent record of asset evolution. Benefits may further include enabling snapshot retrieval by leveraging timestamps, allowing users to easily access specific versions of an asset or its relationships for any given point in time. Further, enhanced queries are facilitated through the described approach, since the inclusion of temporal data in relationships allows for more precise and insightful queries based on specific timeframes. A computing system configured to perform the operations and methods described herein is provided in regard to FIG. 5.

Figure 5:
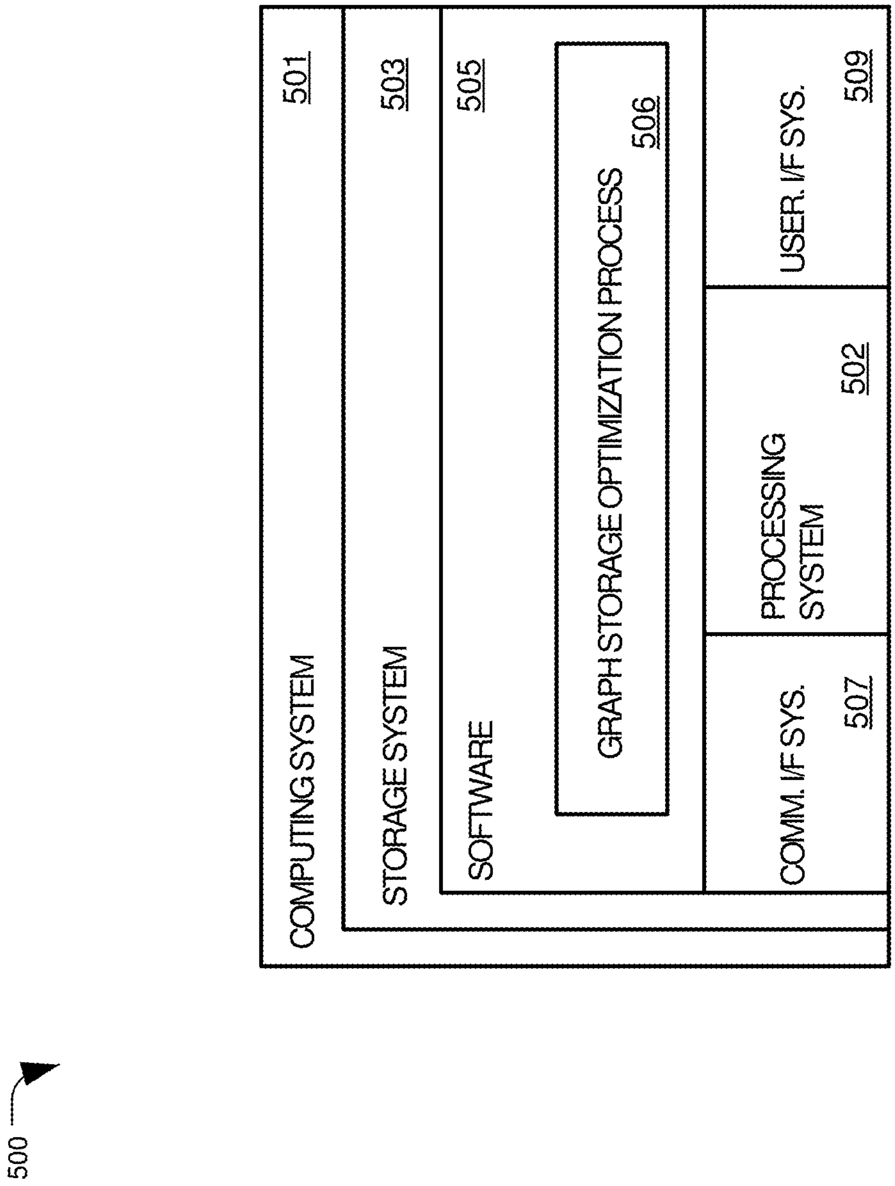
FIG. 5 depicts a diagram of a system configured to implement graph database storage optimization, in accordance with certain embodiments of the present disclosure.

FIG. 5 illustrates an apparatus 500 including a computing system 501 that is representative of any system or collection of systems in which the various processes, systems, programs, services, and scenarios disclosed herein may be implemented. For example, computing system 501 may be an example of computing platform 102, asset tracking system 110 or 210, database 112 or 212, cloud provider 106 or 206, cloud customer 104*a-n*, network 126, or any constituent components as shown and described in FIGS. 1 and 2. Examples of computing system 501 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 501 may be implemented as a single apparatus, system, or device or may be implemented in a distributed manner as multiple apparatuses, systems, or devices. Computing system 501 may include, but is not limited to, processing system 502, storage system 503, software 505, communication interface system 507, and user interface system 509. Processing system 502 may be operatively coupled with storage system 503, communication interface system 507, and user interface system 509.

Processing system 502 may load and execute software 505 from storage system 503. Software 505 may include and implement graph storage optimization process 506, which may be representative of any of the operations for performing a delta-based approach to asset tracking, including evaluating changes to assets in a cloud environment, determining deltas from a representation of the cloud environment stored to a graph database, and creating new nodes and relationships in the same graph database based on the deltas, as discussed with respect to the preceding figures. When executed by processing system 502, software 505 may direct processing system 502 to operate as described herein for at least the various processes, operational scenarios, and sequences discussed in the foregoing implementations. Computing system 501 may optionally include additional devices, features, or functionality not discussed for purposes of brevity.

In some embodiments, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 may include general purpose central processing units, graphical processing units, application specific processors, and logic devices, as well as any other type of processing device, combinations, or variations thereof.

Storage system 503 may comprise any memory device or computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including graph storage optimization process 506 among other functions) may be implemented in program instructions that may, when executed by processing system 502, direct processing system 502 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to implement a bundled binding audit process as described herein. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:

implementing a delta-based graph storage optimization system for asset tracking in a cloud environment, including:

storing a graph database representing a configuration of a cloud environment;

obtaining configuration settings representing a current state of the cloud environment from a cloud platform;

comparing the current state of the cloud environment to a prior state represented by the configuration in the graph database to determine a delta reflecting changes between the configuration from the graph database and the configuration settings from the cloud platform;

creating an asset property node based on the delta; and adding the asset property node to the graph database without creating a new graph based on the configuration settings.

2. The method of claim 1 further comprising:

identifying the delta, further including identifying an asset of the cloud environment that has been updated in the configuration settings since the graph database was last updated.

3. The method of claim 2 further comprising:
identifying the delta, further including performing comparative analysis to compare properties of the asset of the cloud environment from the configuration settings to the properties of the asset in the graph database.
4. The method of claim 3 further comprising:
identifying the delta, further including extracting the delta from the comparative analysis to reflect the properties of the asset that have changed.
5. The method of claim 4 further comprising:
adding the asset property node to the graph database includes creating a new node representing the delta that is related to an asset node representing the asset having the properties that have changed.
6. The method of claim 5 further comprising:
creating the asset property node based on the delta, further including:
including a "from" metadata field and a "to" metadata field in the asset property node indicating a time period during which the properties of the asset property node were valid.
7. The method of claim 6 further comprising:
obtaining the configuration settings, further including:
obtaining configuration data from the cloud platform;
performing an extract transform load (ETL) operation on the configuration data to convert the configuration data into a selected format, wherein the configuration settings are the configuration data in the selected format;
identifying the delta, further including:
converting graph data from the graph database into the selected format; and
comparing the configuration settings in the selected format to the graph data in the selected format.
8. A system comprising:
an asset tracking system configured to implement a delta-based graph storage optimization system for asset tracking in a cloud environment, including:
store a graph database representing a configuration of a cloud environment;
obtain configuration settings representing a current state of the cloud environment from a cloud platform;
compare the current state of the cloud environment to a prior state represented by the configuration in the graph database to determine a delta reflecting changes between the configuration from the graph database and the configuration settings from the cloud platform;
create an asset property node based on the delta; and
add the asset property node to the graph database without creating a new graph based on the configuration settings.
9. The system of claim 8, wherein identifying the delta further includes:
identify an asset of the cloud environment that has been updated in the configuration settings since the graph database was last updated.
10. The system of claim 8, wherein identifying the delta further includes:
perform comparative analysis to compare properties of an asset of the cloud environment from the configuration settings to the properties of the asset in the graph database.
11. The system of claim 10, wherein identifying the delta further includes:
extract the delta from the comparative analysis to reflect the properties of the asset that have changed.
12. The system of claim 8, wherein adding the asset property node to the graph database further includes:
create a new node representing the delta that is related to an asset node representing an asset from the cloud environment that has changed.
13. The system of claim 8, wherein creating the asset property node based on the delta further includes:
include a "from" metadata field and a "to" metadata field in the asset property node indicating a time period during which properties of the cloud environment reflected in the asset property node were valid.
14. The system of claim 8, wherein obtaining the configuration settings further includes:
obtain configuration data from the cloud platform;
perform an extract transform load (ETL) operation on the configuration data to convert the configuration data into a selected format, wherein the configuration settings are the configuration data in the selected format;
identify the delta, further including:
convert graph data from the graph database into the selected format; and
compare the configuration settings in the selected format to the graph data in the selected format.
15. A memory device storing instructions that, when executed, cause a processor to perform a method comprising:
implementing a delta-based graph storage optimization system for asset tracking in a cloud environment, including:
storing a graph database representing a configuration of a cloud environment;
obtaining configuration settings representing a current state of the cloud environment from a cloud platform;
comparing the current state of the cloud environment to a prior state represented by the configuration in the graph database to determine a delta reflecting changes between the configuration from the graph database and the configuration settings from the cloud platform;
creating an asset property node based on the delta; and
adding the asset property node to the graph database without creating a new graph based on the configuration settings.
16. The memory device of claim 15 storing instructions that, when executed, cause the processor to perform the method further comprising:
identifying the delta, further including identifying an asset of the cloud environment that has been updated in the configuration settings since the graph database was last updated.
17. The memory device of claim 15 storing instructions that, when executed, cause the processor to perform the method further comprising:
identifying the delta, further including:
performing comparative analysis to compare properties of the asset of the cloud environment from the configuration settings to the properties of the asset in the graph database; and
extracting the delta from the comparative analysis to reflect the properties of the asset that have changed.
18. The memory device of claim 15 storing instructions that, when executed, cause the processor to perform the method further comprising:

adding the asset property node to the graph database includes creating a new node representing the delta that is related to an asset node representing an asset from the cloud environment that has changed.

19. The memory device of claim 15 storing instructions that, when executed, cause the processor to perform the method further comprising:

creating the asset property node based on the delta, further including:

including a "from" metadata field and a "to" metadata field in the asset property node indicating a time period during which properties of the cloud environment reflected in the asset property node were valid.

20. The memory device of claim 15 storing instructions that, when executed, cause the processor to perform the method further comprising:

obtaining the configuration settings, further including:

obtaining configuration data from the cloud platform;

performing an extract transform load (ETL) operation on the configuration data to convert the configuration data into a selected format, wherein the configuration settings are the configuration data in the selected format;

identifying the delta, further including:

converting graph data from the graph database into the selected format; and comparing the configuration settings in the selected format to the graph data in the selected format.

* * * * *